S. D. & H. T. LATTY.
VEHICLE STEERING GEAR.
APPLICATION FILED NOV. 21, 1906.

926,753.

Patented July 6, 1909.

Witnesses.
D. T. Davies
Jno. F. Oberlin

Inventors.
Samuel D. Latty and
Henry T. Latty
by J. D. Fay
their attorney.

UNITED STATES PATENT OFFICE.

SAMUEL D. LATTY AND HENRY T. LATTY, OF CLEVELAND, OHIO.

VEHICLE STEERING-GEAR.

No. 926,753.   Specification of Letters Patent.   Patented July 6, 1909.

Application filed November 21, 1906. Serial No. 344,424.

*To all whom it may concern:*

Be it known that we, SAMUEL D. LATTY and HENRY T. LATTY, both citizens of the United States, residents of Cleveland, county of Cuyahoga, and State of Ohio, have invented a new and useful Improvement in Vehicle Steering-Gears, of which the following is a specification, the principle of the invention being herein explained and the best mode in which we have contemplated applying that principle, so as to distinguish it from other inventions.

Our invention, relating as indicated to improvements in vehicle steering gear, has regard more particularly to the provision of an improved form of steering gear for children's vehicles, especially children's vehicles of the coaster or automobile type. It need, however, scarcely be stated that such invention may be applied with equally successful results to other vehicles of different type entirely, where the features of simplicity and economy in structure, and ease of operation as presented by our steering gear are desiderata.

Said invention consists of means hereinafter fully described and particularly set forth in the claims.

The annexed drawing and the following description set forth in detail certain means embodying the invention, such disclosed means, however, constituting but one of various mechanical forms in which the principle of the invention may be used.

Figure 1:
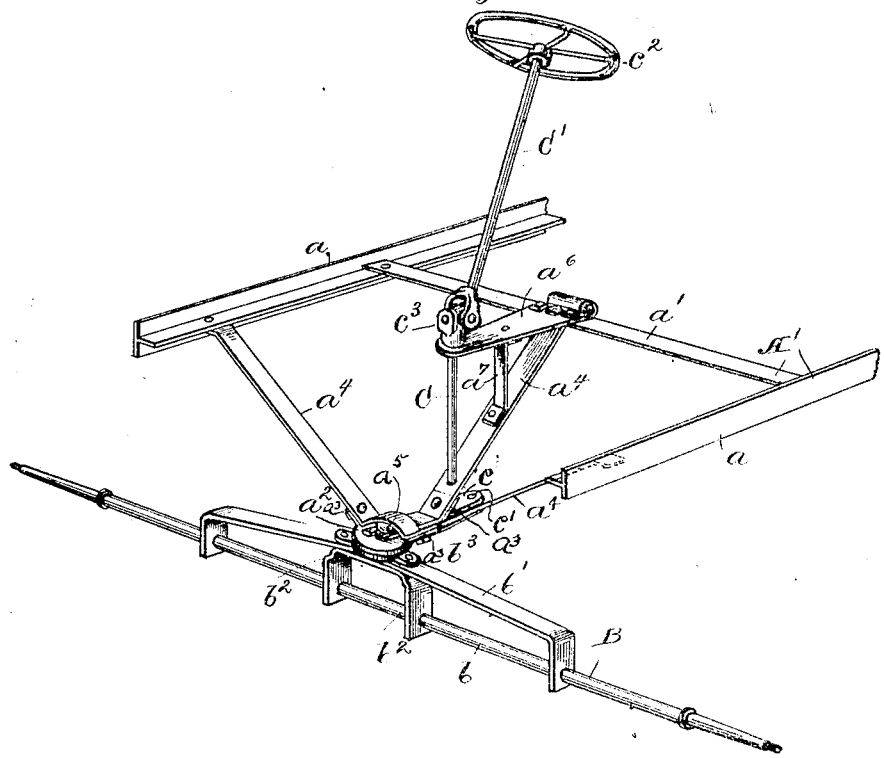
Figure 2:
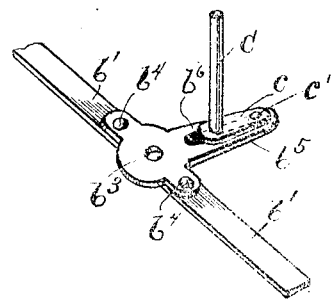

In said annexed drawing: Figure 1 is a perspective view of the forward running gear and the front portion of the frame of a vehicle with our improved steering gear incorporated therein; Fig. 2 is a view, likewise in perspective, of a detail of the steering gear mechanism proper.

Our invention having as its primary object the provision of a simple form of steering mechanism for children's vehicles, we have chosen to illustrate the same in connection with a vehicle of this class. In Fig. 1 then, A represents the frame of such a vehicle, which may be of any suitable construction, consisting as shown simply of side members $a$ joined together by means of cross bars $a'$, Fig. 1. The forward end of such frame, which alone appears in the figure in question, is pivotally supported on front axle B disposed thereunder. The particular forward running gear construction here appearing comprises as a base element a trussed axle, already referred to as B, which consists of a spindle $b$ to which is attached at two points intermediate of its ends an upper, arched truss member $b'$, this latter being supported by an intermediate truss member $b^2$. The object of this construction being to secure a suitable support for the fifth wheel of the vehicle, a lower bearing plate $b^3$ is fastened to the top of upper truss member $b'$, such bearing plate being rigidly secured in place by means of two studs $b^4$, Fig. 2.

In conjunction with the forward end of the frame which is designed to pivotally rest upon the axle just described there is provided an upper bearing plate $a^2$ complementary to lower bearing plate $b^3$ and pivotally secured thereto by means of a king-bolt $a^5$. Such upper bearing plate $a^2$ is provided with a plurality of ears $a^3$, preferably three as shown, to which are secured the lower ends of brace members $a^4$. These brace members form a sort of inverted tripod, and have their upper ends attached to the vehicle frame thereby supporting the same on the fifth-wheel.

The forward running gear construction having thus been set up in detail, the steering gear which forms the subject matter of this, our present invention, may now be readily explained.

Projecting rearwardly from lower bearing plate $b^3$ and in the same horizontal plane therewith is an arm $b^5$ formed with a longitudinally disposed elongated opening or slot $b^6$. It is evident, hence, that any movement of such arm will be productive of a corresponding movement on the part of trussed front axle B. To effect such movement there is vertically mounted in the vehicle frame to the rear of the pivotal axis formed by king-bolt $a^5$ on which axle B turns, a steering-shaft C. Suitable bearings for such shaft are provided in intermediate brace member $a^4$ and in a bracket $a^6$ projecting forwardly from the point where such brace member is secured to cross bar $a'$, such bracket being in turn suitably supported upon such brace by a short leg $a^7$. The lower end of steering-shaft C is designed to be eccentrically connected with rearwardly projecting arm $b^5$. To this end it is provided with a short flattened arm or face plate $c$ near the outer end of which is mounted a downwardly projecting stud $c'$ that slidably engages the slot $b^6$ in axle arm $b^5$. Rotation of shaft C, it will be readily apparent, will swing arm $b^5$ through a corresponding arc, the limit of such motion to either side being determined by the length of steering-shaft arm c.

Shaft C, previously alluded to as forming the turning member of our steering gear, requires as stated to be vertically disposed. Inasmuch as it is more convenient usually, to have the steering shaft incline from the vertical and toward the steersman, we make such shaft in the present instance in two flexibly connected sections. The lower of these sections is the portion designated by reference letter C, and already described as being connected with slotted arm $b^5$. The upper section C', which bears the steering wheel $c^2$, is connected with such lower section by means of a universal joint $c^3$. By means of this construction of the shaft, it will be evident that the same is rendered substantially flexible in that the upper portion of the shaft C' may be inclined not only rearwardly but to the one side or the other as suits the convenience of the steersman. Such construction has the further advantage that in crating the vehicle for shipment, the steering shaft need not be taken off, which is more or less difficult in the constructions ordinarily prevailing, nor need it be allowed to project without the crate and thereby be rendered liable to injury in shipment.

By describing our improved steering mechanism in connection with the particular form of front axle construction here shown it is not meant in any way to imply a limitation of the same to such particular application. As has been indicated, the steering gear in question may be used with equally advantageous results not only in various other types of children's vehicles but on other vehicles of like character for the purpose of effecting rotative movement. Such steering gear is not only simple and economical in construction but, also easy to manipulate inasmuch as any desired leverage may be secured by a proper proportioning of the slotted axle arm $b^5$ and steering shaft arm c. In the same way it may be made impossible for the front axle to be turned at such an acute angle as to endanger overturning the vehicle; for not only is the amount of turn that may be voluntarily given to the vehicle thus prescribed but the axle is absolutely held against movement beyond such limit.

Finally by the improved flexible construction of the steering shaft, the necessity heretofore existing, when shipping or storing the vehicle, of either partially disassembling the same or else occupying an excessive amount of room with a cumbrous crate, is entirely obviated. At the same time such steering-shaft construction promotes the convenience of the user and renders the employment of our steering gear mechanism, proper, practicable.

Having thus described our invention in detail, that which we particularly point out and distinctly claim, is:

1. The combination with a vehicle frame, of an axle pivotally secured below said frame, and a steering gear comprising a rearwardly projecting arm rigidly secured to said axle and provided with an elongated slot, a vertically disposed shaft, a rearwardly inclined intermediate brace member and bracket for supporting said shaft, a horizontal rearwardly projecting arm secured to the lower end of said vertical shaft, a pin depending from said horizontal arm and extending into said slot, and means for turning said shaft consisting of a rearwardly inclined supplemental shaft connected to said vertical shaft by a universal joint, and a hand wheel carried by said supplemental shaft.

2. The combination with a vehicle frame, of a trussed axle pivotally secured below said frame, a plate secured to the axle truss and having a rearwardly projecting arm formed with an elongated slot, a fifth wheel resting on said plate, a king-bolt connecting said plate and fifth-wheel, a vertically disposed steering shaft in rear of said fifth wheel, a rearwardly inclined intermediate brace member and bracket for supporting said shaft, a horizontal rearwardly projecting arm secured to the lower end of said vertical shaft, a pin depending from said horizontal arm, and projecting into said slot, and means for turning said shaft.

Signed by us, this 19th day of November, 1906.

SAMUEL D. LATTY.
HENRY T. LATTY.

Attested by—
D. T. DAVIES,
JNO. F. OBERLIN.